United States Patent [19]
Webb

[11] 3,852,905
[45] Dec. 10, 1974

[54] FISH HOOK EMBEDDING DEVICE
[76] Inventor: Clay M. Webb, 1005 E. Mariposa St., Phoenix, Ariz. 85014
[22] Filed: July 11, 1973
[21] Appl. No.: 378,215

[52] U.S. Cl. .......................................... 43/15, 43/25
[51] Int. Cl. ............................................. A01k 87/00
[58] Field of Search ........................... 43/15, 16, 25

[56] References Cited
UNITED STATES PATENTS
| | | | |
|---|---|---|---|
| 2,659,174 | 11/1953 | Leach | 43/15 |
| 2,934,847 | 5/1960 | Duff | 43/15 |
| 3,091,048 | 5/1963 | Thesz | 43/15 |

*Primary Examiner*—Warner H. Camp
*Attorney, Agent, or Firm*—Herbert E. Haynes, Jr.

[57] ABSTRACT

A device for use on a fishing pole to which a fishing line is connected so that the line will be automatically jerked to cause the fish hook to embed itself into the mouth of the fish as soon as the fish bites or tugs at the bait.

1 Claim, 5 Drawing Figures

PATENTED DEC 10 1974   3,852,905

FISH HOOK EMBEDDING DEVICE

BACKGROUND OF THE INVENTION

1. Field of the Invention

This invention relates to fishing equipment and more particularly to a device for automatically embedding a fish hook in the mouth of a fish.

2. Description of the Prior Art

It is well known to the fisherman that ideally he must keep constant surveillance on his fishing line so that when a fish nibbles at the bait, the fisherman can jerk upwardly on the fishing pole to embed the fish hook in the mouth of the fish. This need for constant surveillance can be inconvenient to the fisherman as it limits the number of fishing lines that a single fisherman can tend and limits the amount of distraction that can be tolerated. In some instances this requirement can cause physical discomfort such as in the case of ice fishing.

Various devices have been provided for automatically securing fish on hooks to relieve the fisherman from the above described need for constant surveillance. In general, these prior art devices are quite cumbersome and relatively complex. In some instances, these devices can be quite expensive as they cannot be employed with conventional fishing tackle but instead utilize special mounting bases, poles and the like.

One particular prior art device is disclosed in U.S. Pat. No. 2,567,340, issued on Sept. 11, 1951, to G. A. Lytle. This mechanism is designed for installation in a fishing line with that portion of the line which extends from the pole being attached to an elongated tubular case. The other portion of the line which extends from the case and has the fish hook thereon is connected internally of the case to a spring biased ratchet-pawl assembly which is adapted to snap the line to embed the hook when a fish nibbles at the hook. This mechanism is intended to move with the fishing line and therefore will enter the water thus subjecting the device to rust and to other forms of contamination. Also, this type of mechanism may be easily lost due to line breakage caused by entanglement with submerged objects and the like.

Another prior art device is disclosed in U. S. Pat. No. 2,578,887, issued on Dec. 18, 1951, to V. L. Jackson et al. This device includes a base upon which a fishing pole is mounted. The pole is formed in two sections connected by a spring and is provided with a trigger mechanism so that the pole sections may be moved from their normally aligned positions and held in a loaded position. In the loaded position the pole sections are positioned in approximately a 90° relationship with each other and will snap into their normal position when the trigger mechanism is tripped. A fishing line is attached to the pole and to the trigger mechanism so that when a fish bites the hook, the trigger mechanism will be tripped thus embedding the hook. As can be seen, this particular device employs all special equipment and would therefore be relatively expensive for a fisherman to add to his existing fishing tackle.

It may be seen that the two previously described prior art devices are connected to the fishing line in such a manner so as to continue effecting the line after the fish hook is embedded in the mouth of the fish. These effects can be detrimental particularly in the instances where a fish must be eased into a boat by careful reeling in and paying out of the fishing line such as is accomplished by a conventional fishing reel.

Therefore, it would be desirable to provide a new and useful fish hook embedding device which overcomes some of the drawbacks of the prior art devices.

SUMMARY OF THE INVENTION

The fish hook embedding device of the present invention may be integral with or demountably attachable to the end of the conventional fishing pole. The device is coupled to the fishing line in a manner so that when a fish nibbles at the hook the device will be actuated to pull the line and embed the hook in the mouth of the fish. This same actuation of the device will automatically disengage the line from the line pulling mechanism and thus free the line from any subsequent effects the device may have thereon.

Accordingly, it is an object of the present invention to provide a new and useful fish hook embedding device.

Another object of the present invention is to provide a new and useful fish hook embedding device which is of simple and economical construction.

Another object of the present invention is to provide a new and useful fish hook embedding device which is used in conjunction with a conventional fishing pole.

Another object of the present invention is to provide a new and useful fish hook embedding device which pulls the fishing line for embedding the hook in the mouth of the fish when the fish nibbles at the fish hook.

A further object of the present invention is to provide a new and useful fish hook embedding device of the above described character which is automatically disengaged from the fishing line after the hook has been embedded in the mouth of the fish.

The foregoing and other objects of this invention, as well as the invention itself, may be more fully understood when read in conjunction with the following drawings.

DESCRIPTION OF THE PREFERRED EMBODIMENTS

Figure 1:
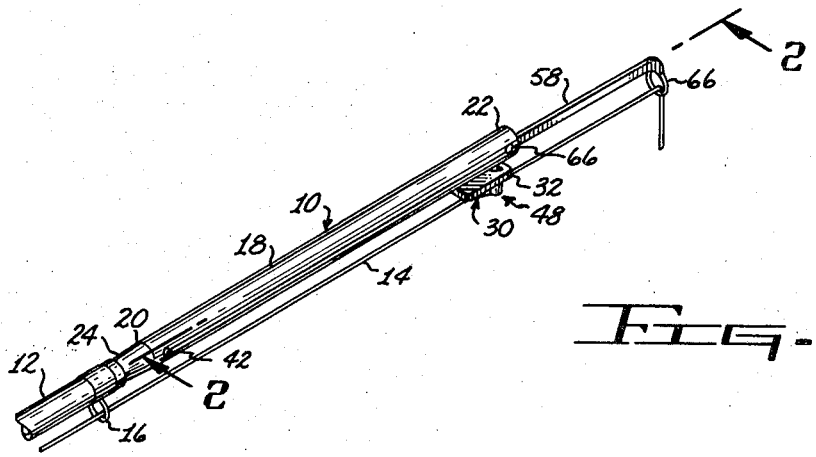
FIG. 1 is a perspective view showing a fragmentary portion of a fishing pole having the device of the present invention mounted thereon.

Reference is now made to the drawings wherein FIG. 1 illustrates the fish hook embedding device, indicated generally by the reference numeral 10, as being attached to a conventional fishing pole 12. A fishing line 14 extends from the rearward portion of the pole (not shown) through the usual eye 16, as is conventional, and is connected to the device 10 as will hereinafter be described in detail.

Figure 2:
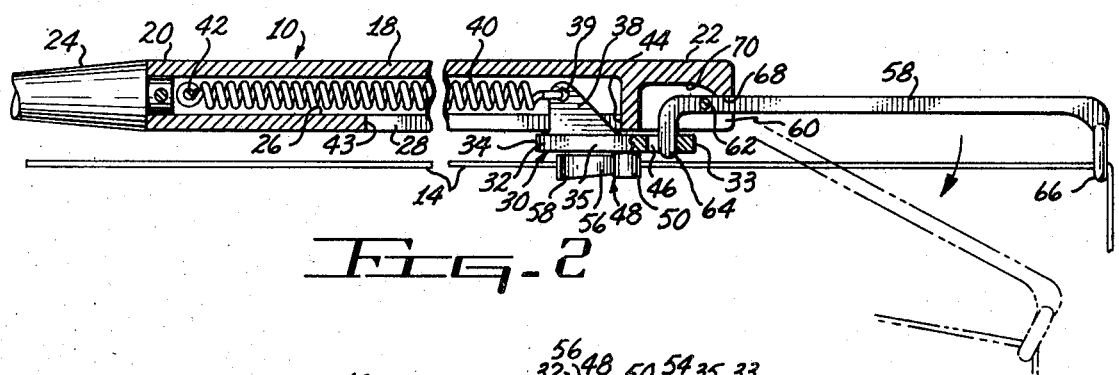
FIG. 2 is an enlarged sectional view taken on the line 2—2 of FIG. 1.

The fish hook embedding device includes an elongated housing 18 of tubular construction having an inner end 20 and an outer end 22. The inner end 20 of the housing 18 is provided with means thereon by which the device 10 may be demountably attached to the fishing rod 12, and as shown, this means is preferably a conical element 24 integrally formed with the housing which allows the housing to be slidably positioned within the usual hollow end of the pole 12. As seen in FIG. 2, the housing 18 is provided with an elongated bore 26 which extends from adjacent the inner end 20 to adjacent the outer end 22 of the housing. An elongated longitudinal slot 28 is formed in the housing 18 and is radially positioned to extend upwardly from the periphery of the housing into the bore 26.

A carriage 30 is mounted, as will be described in detail, for movement along the housing 18 between an extended position adjacent the outer end 22 and a retracted position adjacent the inner end 20 thereof. As seen best in FIG. 3, the carriage 30 includes a plate 32 having a forward edge 33, a rear edge 34 and a pair of side edges 35 and 36. A tongue 38 is integral with the plate 32 and extends upwardly therefrom through the slot 28 into the bore 26 of the housing 18. The tongue 38 has an aperture 39 formed therein to which one end of a tension spring 40 is attached. The spring 40 is disposed within the bore 26 of the housing 18 and has its other end secured adjacent the inner end 20 of the housing on a transverse pin 42. The spring biasingly urges the carriage 30 toward its retracted position and mounts the carriage to the housing for movement therealong as limited by the opposite ends 43 and 44 of the slot 28 which acts as a stop by engaging the tongue 38.

Th plate 32 of the carriage 30 has an aperture 46 formed therein adjacent the forward edge 33 thereof by which the carriage 30 is releasably held in its extended position in a manner which will hereinafter be described in detail.

Figure 3:
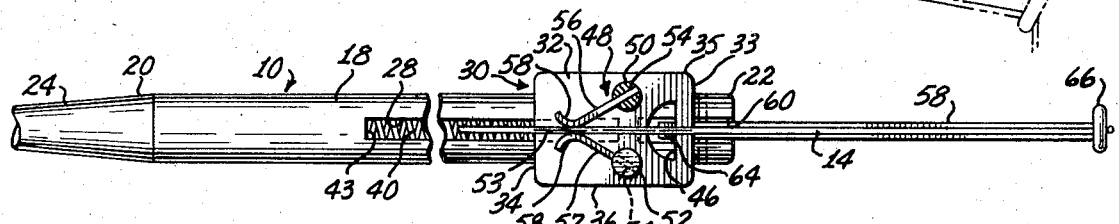
FIG. 3 is a bottom view of the device of the present invention.

A line engaging means 48 is provided on the plate 32 of the carriage 30 for releasably engaging the fishing line 14. The preferred form of the line engaging means 48 is shown in FIGS. 2 and 3 to include a pair of downwardly depending pins 50 and 52 which are positioned adjacent to the side edges 35 and 36, respectively of the plate 32. These pins 50 and 52 are positioned with respect to each other so as to align transversely with a center line 53 extending between the forward and rear edges 33 and 34 of the plate 32. Each of the pins 50 and 52 have a slot 54 formed therein by which spring arms 56 and 57 are secured thereto. The slots 54 are formed in the pins 50 and 52 so that the spring arms 56 and 57 extend from their respective pins at inwardly directed angles and converge upon each other at a point substantially intermediate the pins and the rear edge 34 of the plate.

As seen best in FIG. 3, when the fishing line 14 is positioned between the spring arms 56 and 57, an outwardly directed curved portion 58 which is formed on the rearwardly extending end of each of the arms, will be in engagement with the line. The spring arms 56 and 57 are biased toward each other so that the line 14 is pinched therebetween with sufficient force to keep gravitational forces from causing the line to fall downwardly and thus become disengaged from the carriage 30. This pinching force, in cooperation with the angular disposition of the spring arms 56 and 57, is so regulated that the line 14 may be moved through the arms toward the back of the fishing pole 12 such as by the type of movement accomplished when a fishing reel (not shown) is employed to reel in a line. Attempted movement of the line 14 in the opposite direction, that is, away from the back of the pole 12, will tend to pull the arms 56 and 57 toward each other thus increasing the pinching force applied to the line and thereby resisting movements in this direction.

A lever 58 is mounted to the outer end 22 of th housing 18 within a slot 60 formed therein. The lever 58 is mounted on a pivot pin 62 so as to be movable from a set position, which is shown in solid lines in FIG. 2, to a tripped position shown in broken lines in the same figure. The lever is formed with a depending hook member 64 on its rearwardly disposed end which is positioned to engage the aperture 46 formed in the plate 32 of the carriage 30 when the latter is in the extended position. The carriage 30 is held in its extended position by the hook 64 when the lever 58 is set. When the lever 58 is pivoted to its tripped position, the hook member 64 will be lifted upwardly out of the aperture 46 and the tension spring 40 will move the carriage 30 to its retracted position. This movement of the carriage 30 to its retracted position will carry the fishing line 14 with it when the line is attached, as previously described, to the line engaging means 48 of the carriage, thus, a pull or jerk will be applied to the fishing line which will embed a fish hook (not shown) in the mouth of a fish.

The forwardly disposed end of the lever 58 is provided with a depending eye 66 thereon through which the fishing line 14 is passed. The eye 66 of the layer 58 will be positioned to substantially align with the eye 16 of the fishing pole 12 when the lever 58 is in the set position. This alignment is provided by limiting movement of the lever 58 from the tripped position to the set position thereof by means of a stop member 68 formed within the slot 60 in which the lever is mounted. Movement of the lever 58 toward the tripped position is limited by the roof portion 70 of the slot 60 which comes into engagement with the lever adjacent the hook 64 thereof.

The alignment of the eye 16 of the pole 12 with the eye 66 of the lever 58 when the lever is set will position the fishing line 14 in substantially parallel relationship with the longitudinal axis of the housing 18 and will position the line below the housing so that it will align with the line engaging means 48 of the carriage 30.

When the fish bites at the fish hook (not shown) a pull will be exerted on the fishing line in a substantially downward direction. This pull will move the lever 58 from its set position to its tripped position thus releasing the carriage 30. This releasing of the carriage 30 will be accomplished during approximately the first half of the movement of the lever 58. When the lever 58 reaches the tripped position, broken lines of FIG. 2, it will be seen that the fishing line 14 has moved downwardly and is thus no longer aligned with the line engaging means 48 of the carriage 30. Due to the pinching action of the spring arms 56 and 57 of the line engaging means 48, the disengagement of the line from the line engaging means will be delayed and will not commence until the lever has moved approximately half of the distance from its set position toward its tripped position. This delay insures that the line 14 will remain engaged in the line engaging means 48 until the travel of the carriage 30 to its retracted position has been completed.

It may now be seen that when a fish bites at the fish hook (not shown) the lever 58 will start its movement from the set to the tripped position which will release the carriage 30. The carriage will snap the fishing line 14 to embed the fish hook in the mouth of the fish. The lever 58, in completing its movement to the tripped position, will disengage the fishing line 14 from the line engaging means 48, and the line can then be reeled in and out in the normal manner to bring the fish in.

Figure 4:
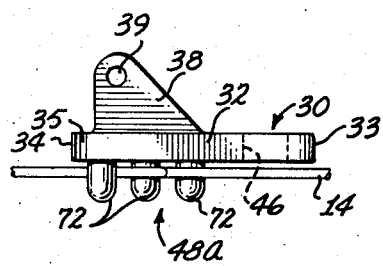
FIG. 4 is an enlarged side view of a modified form of the movable carriage portion of the mechanism of the present invention having the fishing line connected thereto.
Figure 5:
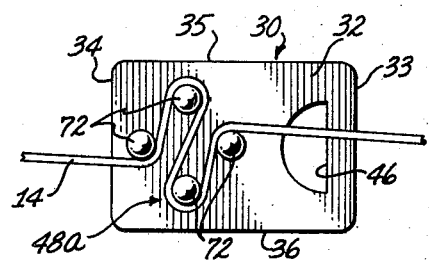
FIG. 5 is a bottom view of the modified carriage illustrated in FIG. 4.

Reference is now made to FIGS. 4 and 5 wherein a modified form of line engaging means 48a is shown. In this embodiment the line engaging means 48a includes a plurality of pins 72 depending from the plate 32 of the carriage 30. The fishing line 14 is wound around the pins 72 such as in the manner shown best in FIG. 5. Normal line tension and the alignment that exists between the eye 16 of the pole 12 and the eye 66 of the lever 58 when that lever is set will hold the fishing line in wound around engagement with the pins 72. The fishing line 14 will be pulled or snapped as previously described upon release of the carriage 30 and the line will subsequently be unwound from the pins 72 when the line is allowed to move downwardly by movement of the lever 58 to its tripped position.

While the principles of the invention have now been made clear in illustrated embodiments, there will be immediately obvious to those skilled in the art, many modifications of structure, arrangements, proportions, the elements, materials, and otherwise, which are particularly adapted for specific environments and operation requirements without departing from those principles.

For example, the spring 40 which biases the carriage 30 toward its retracted position could be mounted below the housing 18 on a suitable depending pin and the carriage could be supportingly moved within longitudinally disposed tracks provided on the housing 18. Further, the fish hook embedding device 10 could also be formed as an integral part of a fishing pole.

The appended claims are therefore intended to cover and embrace any such modifications within the limits only of the true spirit and scope of the invention.

What I claim is:

1. A fishhook embedding device comprising:
   a. an elongated housing having an inner end and an outer end;
   b. a carriage mounted on said housing and longitudinally movable therealong between a retracted position adjacent the inner end of said housing and an extended position adjacent the outer end end of said housing and an extended position adjacent the outer end of said housing;
   c. biasing means connected on one end thereof adjacent the inner end of said housing and on the other end thereof to said carriage for urging said carriage toward its retracted position;
   d. line engaging means on said carriage to which a fishing line is detachably engagable, said line engaging means comprising,
      a pair of spaced apart pins depending downwardly from said carriage and positioned to align with each other transverse to the centerline extending from the rear to the front of said carriage, and
      a spring arm attached to each of said pins and extending angularly inwardly rearwardly therefrom so that said spring arms converge upon each other at a point substantially intermediate the pins and the rear of said carriage, said arms biased toward each other; and
   e. a lever mounted on the outer end of said housing to which the fishing line is attachable, said lever pivotably movable from a set to a tripped position in response to pulling of the fishing line when that line is attached thereto, said lever having means thereon for holding said carriage in the extended position when said lever is set and for releasing said carriage when said lever is tripped.

* * * * *